(12) United States Patent
Agiwal et al.

(10) Patent No.: US 8,898,295 B2
(45) Date of Patent: Nov. 25, 2014

(54) ACHIEVING ENDPOINT ISOLATION BY FAIRLY SHARING BANDWIDTH

(75) Inventors: Ankur Agiwal, Kirkland, WA (US); Cristian Costache, Dublin (IE); Jacek Nowak, Dublin (IE); Kevin O'Regan, Dublin (IE); Gareth Bradshaw, Dublin (IE); Parveen Patel, Redmond, WA (US); Deepak Bansal, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 13/426,581

(22) Filed: Mar. 21, 2012

(65) Prior Publication Data
US 2013/0254375 A1    Sep. 26, 2013

(51) Int. Cl.
*G06F 15/16*    (2006.01)

(52) U.S. Cl.
USPC .......................... 709/224; 370/468; 370/343

(58) Field of Classification Search
CPC ....................................................... H04L 47/10
USPC ......................................................... 709/224
See application file for complete search history.

(56) References Cited

U.S. PATENT DOCUMENTS

| | | | |
|---|---|---|---|
| 6,173,331 B1 | 1/2001 | Shimonishi | |
| 7,453,804 B1 * | 11/2008 | Feroz et al. | 370/230 |
| 2002/0059408 A1 * | 5/2002 | Pattabhiraman et al. | 709/223 |
| 2002/0141341 A1 * | 10/2002 | Haggar et al. | 370/232 |
| 2004/0103193 A1 * | 5/2004 | Pandya et al. | 709/224 |
| 2004/0257994 A1 * | 12/2004 | Paskett et al. | 370/230 |
| 2010/0226390 A1 * | 9/2010 | Yan et al. | 370/468 |
| 2011/0292792 A1 * | 12/2011 | Zuo et al. | 370/230 |
| 2012/0075994 A1 * | 3/2012 | Haggar et al. | 370/235 |
| 2012/0320789 A1 * | 12/2012 | Wu et al. | 370/254 |
| 2013/0275602 A1 * | 10/2013 | Havekes et al. | 709/226 |

OTHER PUBLICATIONS

Popa, et al., "CloudPolice: Taking Access Control out of the Network", In Proceedings of Ninth ACM SIGCOMM Workshop on Hot Topics in Networks, Oct. 20-21, 2010, pp. 1-6.
Popa, et al., "FairCloud: Sharing the Network in Cloud Computing", In Proceedings of Tenth ACM Workshop on Hot Topics in Networks, Nov. 14-15, 2011, pp. 1-6.
Rodrigues, et al., "Gatekeeper: Supporting Bandwidth Guarantees for Multi-tenant Datacenter Networks", In Proceedings of the 3rd Conference on I/O Virtualization, 2011, 8 pages.

(Continued)

*Primary Examiner* — Hamza Algibhah
(74) *Attorney, Agent, or Firm* — Ben Tabor; David Andrews; Micky Minhas (57) ABSTRACT

Computerized methods, systems, and computer-storage media for fairly sharing available bandwidth among endpoints (including physical or virtual machines) of a multi-tenant environment are provided. Initially, a load balancer of the network is programmed to monitor bandwidth used by the endpoints, respectively, and to compare an aggregation of the usage against a network threshold. Also, the load balancer is equipped to dynamically classify the endpoints using the respective monitored bandwidth. Classifying generally involves designating some endpoints as small entities, which individually consume an amount of bandwidth less than an endpoint threshold, and designating other endpoints as large entities, which individually consume an amount of bandwidth greater than the endpoint threshold. Upon the aggregate bandwidth usage overcoming the network threshold, data packets being sent to or transmitted from the large entities are randomly dropped, while data packets being sent to or transmitted from the small entities are unrestrained.

20 Claims, 5 Drawing Sheets

(56) References Cited

OTHER PUBLICATIONS

Chatranon, et al., "Black: Detection and Preferential Dropping of High Bandwidth Unresponsive Flows", In Proceedings of the IEEE International Conference on Communications, vol. 1, May 11-15, 2003, pp. 664-668.

Ballani, et al., "Towards Predictable Datacenter Networks", In Proceedings of the ACM SIGCOMM Conference on Special Interest Group on Data Communication, Aug. 15-19, 2011, pp. 242-253.

Shieh, et al., "Sharing the Data Center Network", In Proceedings of the 8th USENIX Symposium on Networked Systems Design and Implementation, May-Apr. 2011, 14 pages.

"Managed Hosting—Other Options", Retrieved on: Dec. 26, 2011, 6 pages Available at: http://www.savvis.com/en-us/infrastructure-services/managed-hosting/infrastructure-as-a-service/options/pages/home.aspx.

\* cited by examiner

ACHIEVING ENDPOINT ISOLATION BY FAIRLY SHARING BANDWIDTH

BACKGROUND

Large-scale networked systems are commonplace platforms employed in a variety of settings for running applications and maintaining data for business and operational functions. For instance, a data center (e.g., physical portion of a cloud-computing network) may provide a variety of services (e.g., web applications, email services, search engine services, etc.) for a plurality of customers simultaneously. These large-scale networked systems typically include a large number of resources distributed throughout the data center, in which each resource resembles a physical machine or a virtual machine (VM) running on a physical node or host. When the data center hosts multiple tenants (e.g., customer programs), these resources are optimally allocated from the same data center to the different tenants.

Often, multiple VMs will concurrently run on the same physical node within a computing network, or the data center. These VMs that share a common physical node may be allocated to the different tenants and may require different amounts of bandwidth at various times. These networks have limited compute, memory, disk, and network capacity and are typically heavily over-subscribed. When a network is under excessive load (e.g., during a DOS attack), data packets being transmitted via the network are dropped. Conventional network equipment (e.g., load balancer) randomly drops data packets to all VMs on the impacted network segment when under load, which leads to performance degradation of all network tenants. In a multitenant environment (e.g., cloud-computing network), this impacts tenants that are not associated with the increased load. This results in unfair distribution of network capacity within virtualized environments, where unrelated tenants share the physical resources of a single host and the network.

For example, today, the load balancer may begin randomly dropping data packets without any consideration of the destination or origination of those data packets. That is, the load balancer does not monitor or factor in which VMs are seeing a higher load than others when carrying out the randomized decrescendo of traffic. In order to more fairly allocate the impact of dropped data packets within the cloud-computing network, the present invention introduces technology for sharing available bandwidth between VMs by reprogramming load balancers within a cloud-computing network to monitor bandwidth usage and probabilistically discard data packets, when necessary, based on the network's overall stress level and/or the amount of traffic an individual VM is experiencing.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention are directed toward technology for sharing available bandwidth between tenants in a fair manner, such that those endpoints (e.g., instances of customer programs, or VMs running portions of distributed applications) associated with an increased level of load on the network are the ones that are primarily adversely affected to reduce the level of load. In one embodiment, the aspects of the present invention relate to reprogramming load balancers within a cloud-computing network to monitor bandwidth usage and probabilistically discards packets as a function of the network's overall stress level and/or the amount of traffic an individual endpoint is presently experiencing.

In one example, regular usage of a system during a peak time may result in a high load placed on the multitenant environment. If an attack (e.g., DOS attack) occurs while the multitenant environment is experience the high load, a load balancer may estimate that the network capacity of the system is exceeded upon measuring a high volume of data flowing through the multitenant environment. When the compute capacity is estimated to be exceeded, the load balancer attempts to throttle the data flowing to the endpoints targeted by the attack while limiting the impact on performance of the nontargeted endpoints. Under heavy load scenarios, this innovative functionality of the load balancer leaves endpoints consuming a low level of bandwidth (e.g., small entities) unaffected and fairly distributes the pain between endpoints consuming a high level of bandwidth (e.g., large entities). In attack scenarios, this functionality isolates the negative impact of the attack to the endpoints targeted by the attack, even when other nontargeted endpoints share the same physical host and/or network connection. Thus, collateral inefficiencies conventionally resulting from these attacks are contained by ensuring that endpoints unrelated to the causation of the high level of load are allowed to continue operation as usual. In other words, the load balancer is equipped to implement algorithm(s) for sharing bandwidth fairly between endpoints of the multitenant environment.

Generally, multitenant environments include multiple unrelated tenants, or customers, which share the same resources (e.g., host computers and network links). Often, various network services are run within the data centers that support the various capabilities of the multitenant environments, where the network services are typically provided for tenants that have a subscription with the cloud-computing network. These network services (e.g., applications) consume the available resources of the data center, such as network capacity (storage and compute). To ensure that the network capacity is not disproportionally consumed by just a few tenants, the load balancer implements algorithm(s) to fairly distribute shared network capacity, or bandwidth, between tenants (e.g., network users) or endpoints of a tenant's application (e.g., network services).

In embodiments, as more fully discussed below, the algorithm(s) typically reside within or are accessible to the load balancer or other components that federate load across the tenants' endpoints. In one instance, the algorithm(s) allow the load balancer to estimate a profile size of the network, in order to fairly distribute the available bandwidth in light of the total capacity. In another instance, when the load balancer detects that there is not enough total capacity to completely satisfy the usage requirements of all the tenants competing for resources, the load balancer employs the algorithm(s) to fairly share the bandwidth within the multitenant environments to isolate the impact of congestion/attack to the tenants presently experiencing the high rates of traffic. As a result, the load balancer prevents tenants presently consuming a low bandwidth from being penalized during congestion/attack.

BRIEF DESCRIPTION OF THE DRAWINGS

Embodiments of the present invention are described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to methods, computer systems, and computer-readable media for fairly sharing available bandwidth among endpoints (e.g., instances of distributed applications and virtual machines) of a multi-tenant environment are provided. Initially, a load balancer of the network is programmed to monitor bandwidth used by the endpoints, respectively, and to compare an aggregation of the usage against a network threshold. Also, the load balancer is equipped to dynamically classify the endpoints using the respective monitored bandwidth. In one instance, classifying involves dynamically categorizing endpoints based on, in part, the amount of traffic flowing through the system to destination or originating endpoints using the address at a port (e.g., web traffic to port 80 and secure data to port 443). In this way, addresses (e.g., IP addresses, Ethernet MAC addresses, and other identifiers) entered within the headers of data packets flowing to or from the IP endpoints are read and processed to compute the amount of traffic and/or data each of the IP endpoints is experiencing at a given point.

In another instance, classifying involves designating some endpoints as small entities, which individually consume an amount of bandwidth less than an endpoint threshold, and designating other endpoints as large entities, which individually consume an amount of bandwidth greater than the endpoint threshold. Upon the aggregate bandwidth usage overcoming the network threshold, data packets being sent to or transmitted from the large entities are randomly dropped, while data packets being sent to or transmitted from the small entities are unrestrained. In an exemplary embodiment, randomly dropping data packets involves probabilistically dropping data packets in accordance with a size of the large entities (e.g., increasing the number of randomly dropped data packets per second as the size of a particular large entity grows).

In one aspect, embodiments of the present invention relate to one or more computer-readable media having computer-executable instructions embodied thereon that, when executed, perform a method for fairly sharing bandwidth of a network between tenants to achieve isolation of the tenants. Initially, the method may commence upon a load balancer monitoring the bandwidth consumed by endpoints within the network. It should be appreciated and understood that embodiments of the present invention contemplate the logic of the load balancer being distributed on network components that include, but are not limited to, a router or other gateway(s) leading to a network and/or tenants of the network. Typically, monitoring the bandwidth consumed by endpoints of the network includes measuring a flow of data-packet traffic over network connections that link a load balancer with the network endpoints, respectively.

In an exemplary embodiment, the method may further involve dynamically classifying the network endpoints using the monitored bandwidth. Typically, classifying comprises: designating one or more of the network endpoints as small entities upon determining that an amount of the bandwidth consumed by the small entities, respectively, is below a predefined threshold; and designating one or more of the network endpoints as large entities upon determining that an amount of the bandwidth consumed by the large entities, respectively, is above a predefined threshold.

A determination of whether the network is currently experiencing a high level of load or a low level of load is performed. This determination may entail comparing a first network threshold against an aggregation of the bandwidth consumed across the network endpoints. When the aggregation of consumed bandwidth is determined to be greater than the first network threshold, data packets being sent to or transmitted from the large entities are randomly dropped (e.g., probabilistically dropping the data packets depending on how much more bandwidth the large entities are consuming above the first network threshold), while data packets being sent to or transmitted from the small entities are allowed to flow unimpeded. When the aggregation of consumed bandwidth is determined to be less than the first network threshold, data packets being sent to or transmitted from the large entities and the small entities are allowed to flow unimpeded.

In one example of randomly dropping data packets to the network endpoints designated as large entities, the rate at which data packets are randomly dropped is dynamically adjusted in accordance with the level of load on the network. As used herein, "dynamically adjusting" the rate at which data packets are randomly dropped may involve tying the rate to level of load on the network such that an increase or decrease in the level of load causes the data-packet-discard rate to increase or decrease, respectively, in a linear, exponential, etc., fashion.

In another aspect, embodiments of the present invention relate to a computer system capable of performing load-balancing operations with respect to endpoints of a network that receive or originate data packets. The computer system includes at least one physical machine (e.g., node of a data center) configured with a computer-storage medium that has a plurality of computer software components running thereon. Initially, the computer software components include a traffic-monitoring component, an entity-designating component, and a load-balancing component. In operation, the traffic-monitoring component is capable of abstracting a first level of bandwidth consumption of a first network endpoint from a network connection to the first network endpoint. The traffic-monitoring component may also be capable of abstracting a second level of bandwidth consumption of a second network endpoint. Further, the traffic-monitoring component may derive an aggregation of the first and second abstracted bandwidths, which is employed to detect a level of load on the network.

In embodiments, the entity-designating component is capable of dynamically classifying the first and second network endpoints using the first and second abstracted bandwidths. Typically, classifying comprises: designating the first network endpoint as a small entity upon determining that the first level of bandwidth consumed by the first network endpoint is below an endpoint threshold; and designating the second network endpoint as a large entity upon determining that the second level of bandwidth consumed by the second network endpoint is above the endpoint threshold. In one embodiment, the endpoint threshold is calculated using a percentage of capacity allocated to network connections reaching the first and second network endpoints, respectively.

Upon identifying the detected level of load exceeds a first network threshold, the load-balancing component is capable of randomly dropping the data packets sent to or transmitted by the second network endpoint. At the same time, the load-balancing component is capable of refraining from dropping the data packets being sent to or transmitted by the first network endpoint. In one instance, the process of identifying that the detected level of load exceeds a first network threshold involves comparing the aggregation of the first and second bandwidths against the first network threshold.

Further, upon identifying the detected level of load exceeds a second threshold, the load-balancing component is configured to randomly drop the data packets sent to or transmitted by the first and second network endpoints. As used herein, the second threshold represents a value of usage of network bandwidth that is greater than a value of usage of network bandwidth represented by the first predefined threshold.

Even further, the load-balancing component is configured to increase a rate at which the data packets sent to or transmitted by the second network endpoint are dropped upon recognizing an increase in the second level of bandwidth consumed by the second network endpoint. Generally, the rate at which the data packets sent to or transmitted by the second network endpoint are dropped is linearly related to the second level of bandwidth consumed by the second network endpoint. However, other embodiments of the present invention contemplate exponentially or otherwise tying the second network endpoint's data-packet-discard rate to the second level of bandwidth consumed by the second network endpoint.

In yet another aspect, embodiments of the present invention relate to a computerized method for limiting a rate of data packets flowing to or from endpoints of a network that are consuming an elevated amount of available bandwidth. In embodiments, the method involves comparing an aggregation of the available bandwidth being consumed by the network endpoints against a first network threshold. When the aggregate bandwidth remains below the first network threshold, the method involves allowing the data packets to flow to or from the network endpoints without implementing a restriction thereto.

When the aggregate bandwidth overcomes the first network threshold, the method involves the performing of various procedures for fairly sharing bandwidth by enforcing a limitation on the rate of data packets flowing to or from the endpoints of a network by focusing the enforced limitations on those endpoints that are consuming an elevated amount of available bandwidth. In an exemplary embodiment, the various procedures involve, but are not limited to the following: dropping one or more of the data packets being conveyed to large entities (i.e., representing one or more of the network endpoints presently experiencing a high rate of traffic of the data packets within the network); and refraining from dropping one or more of the data packets being conveyed to small entities (i.e., representing one or more of the network endpoints presently experiencing a low rate of traffic of the data packets within the network).

In some embodiments, as mentioned above, the aggregate bandwidth may overcome a second network threshold. In this case, one or more of the data packets being conveyed to the large entities and to the small entities are dropped within the network. This is because dropping just data packets destined to or originating from the large entities will not sufficiently reduce the amount of bandwidth consumption at a speed that prevents surpassing the available network compute capacity. As used herein, the second network threshold represents a higher value of usage of the network bandwidth in comparison to a value of usage of network bandwidth represented by the first predefined threshold.

Having briefly described an overview of embodiments of the present invention, an exemplary operating environment suitable for implementing embodiments of the present invention is described below. In particular, an exemplary operating environment supports functionality of algorithm(s) (e.g., implemented by the load balancer of FIG. 2) that allows endpoints or VMs residing on a common physical node to fairly share the resources of a cloud-computing network; thus, ameliorating a stressed condition of overloading the network's resources while penalizing or adversely affecting throughput to unrelated tenants unnecessarily.

Operating Environment

Figure 1:
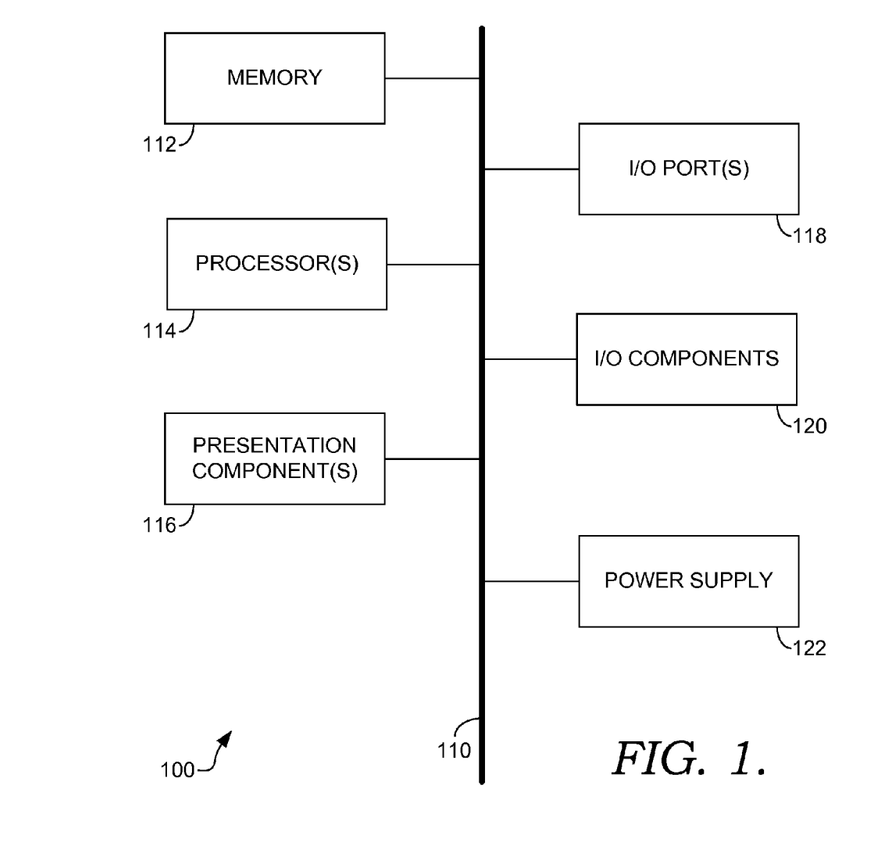
FIG. 1 is a block diagram of an exemplary computing environment suitable for use in implementing embodiments of the present invention.

Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant, network device, or other handheld device. Generally, program modules including routines, programs, objects, components, data structures, etc., refer to code that performs particular tasks or implements particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "network device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and nonremovable media. By way of example, and not limitation, computer-readable media may comprise computer storage media and communication media. Computer storage media include both volatile and nonvolatile, removable and nonremovable media implemented in any method or technology for storage of information such as computer-readable instructions, data structures, program modules, or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium, which can be used to store the desired information and which can be accessed by computing device 100. Communication media typically embody computer-readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network (e.g., fiber optics) or direct-wired connection, and wireless media such as acoustic, RF, infrared, and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

System for Implementation

Figure 2:
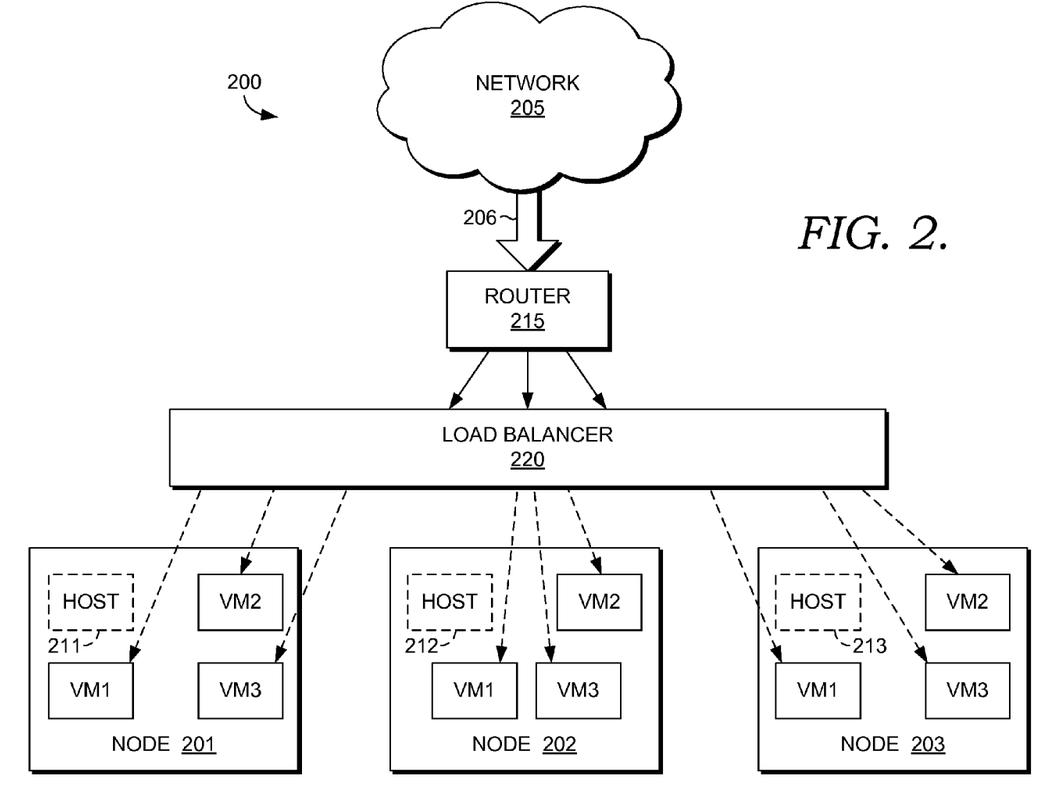
FIG. 2 is a block diagram illustrating an exemplary cloud-computing network, suitable for use in implementing embodiments of the present invention, that is configured to employ a load balancer for controlling a flow of data-packet traffic to and from a network.

With reference to FIGS. 1 and 2, physical nodes 201, 202, and 203 may be implemented by the exemplary computing device 100 of FIG. 1. One or more of the virtual machines (VMs) VM1, VM2, and VM3 running on the nodes 201, 202, and 203 may include portions of the memory 112 of FIG. 1 and/or portions of the processors 114 of FIG. 1. In embodiments, the one or more of VM1, VM2, and VM3 may represent a respective guest partition of the nodes 201, 202, and 203, respectively, where a "guest partition" is generally enabled to host a service application, or, at least, a portion thereof. Generally, the service application is owned by a tenant (e.g., customer of the cloud-computing network) within a multitenant environment that hosts the service application in a distributed manner. The nodes 201, 202, and 203 may further support hosts 211, 212, and 213, respectively, running thereon. In embodiments, the hosts 211, 212, and 213 represent root partitions of the nodes 201, 202, and 203, respectively, where the "root partition" is generally tasked with generally managing requests from the guest partitions, such as requests to implement disk I/O operations or requests for computer bandwidth associated with incoming or outgoing data packets.

Turning now to FIG. 2, a block diagram is illustrated, in accordance with an embodiment of the present invention, showing an exemplary cloud-computing network 200 that is configured to fairly share bandwidth among endpoints, such as VM1, VM2, and VM3 or role instances of a tenant's service/application. As illustrated, the network 205 may issue/distribute a flow of data packets 206 to the endpoints of services/applications hosted on the VMs. A router 215 is employed to convey the data packets 206 to one or more load balancers. For simplicity of discussion, only one load balancer 220 is illustrated and discussed, although a scenario where many load balancers are communicatively coupled to the router 215 are contemplated by embodiments of the present invention. In embodiments, the router 215 is used to transport data-packet traffic to the load balancer 220, which, in turn, selectively throttles the flow prior to transferring the data packets 206 on to the VMs.

Although no service-application portions (e.g., role instance) are illustrated in FIG. 2, it should be understood that various component programs of various service applications may be assigned to and placed upon the VMs, as discussed more fully below. That is, the VMs hosted by the nodes 201, 202, and 203 may be occupied by various service applications. By way of example, a portion of service application A may occupy VM1 on node 201 while portions of service application B may occupy VM2 and VM3 on node 201, where each of the VMs are instantiated on the same physical node 201 to support functionality of the service applications A and B. It should be noted that application C may also occupy VMs on multiple nodes.

It should be understood and appreciated that the cloud-computing network 200 shown in FIG. 2 is merely an example of one suitable computing system environment and is not intended to suggest any limitation as to the scope of use or functionality of embodiments of the present invention. For instance, the cloud-computing network 200 may be a public cloud, a private cloud, or a dedicated cloud. In another instance, the network 200 represents a non-cloud network employed by an internet service provider (ISP) for managing capacity of its customers. Neither should the cloud-computing network 200 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy. In addition, any number of physical machines, virtual machines, data centers, endpoints, or combinations thereof may be employed to achieve the desired functionality within the scope of embodiments of the present invention.

The cloud-computing network 200 typically includes data centers configured to host and support operation of the VMs that host portions (e.g., role instances or other endpoints) of distributed services/applications owned by a plurality of tenants of the cloud-computing network 200. The terms "service" or "application," as used interchangeably herein, broadly refer to any software, or portions of software, that runs on top of, or accesses storage locations and/or compute resources within, the cloud-computing network 200. In one embodiment, an endpoint, such as endpoints 301-305 of FIG. 3, may represent a portion of software or a component program that participates in supporting functionality of the service application. It will be understood and appreciated that the endpoints shown in FIG. 3, which run on top of the VMs of FIG. 2, are merely an example of suitable parts to support a service/application and are not intended to suggest any limitation as to the scope of use or functionality of embodiments of the present invention.

Generally, VMs of FIG. 2 are instantiated and designated to one or more services/applications, respectively, based on demands (e.g., amount of processing load) placed on the service/application. As used herein, the phrase "virtual machine" is not meant to be limiting and may refer to any software, application, operating system, or program that is executed by a processing unit to underlie the functionality of the endpoints of the services/applications associated with differing tenants.

Further, the VMs may request processing capacity, access to storage locations, resources, and other assets (e.g., hosting agent) within the nodes 201, 202, and 203 to properly support the requests of endpoints of the services/applications. In response, the VMs may be dynamically allocated network bandwidth (e.g., resources, CPU processing-capacity, or disk I/O) to satisfy a current workload. The hosts 211, 212, and 213 may assist with allocating resources to the VMs, while the load balancer 220 may manage throttling of the data packets 206 issued to the VMs.

As discussed above, the VMs may be dynamically allocated resources within the nodes 201, 202, and 203. Per embodiments of the present invention, the nodes 201, 202, and 203 of FIG. 2 and the load balancer 220 of FIG. 3 may represent any form of computing device, such as, for example, a personal computer, a desktop computer, a laptop computer, a mobile device, a consumer electronic device, server(s), the computing device 100 of FIG. 1, and the like. In one instance, the nodes 201, 202, and 203 support the operations of the VMs, respectively, while simultaneously hosting other virtual machines or endpoints (not shown) carved out for supporting other tenants of the cloud-computing network 200, where the tenants represent various different customers who own services/applications running on the cloud-computing network 200.

Figure 3:
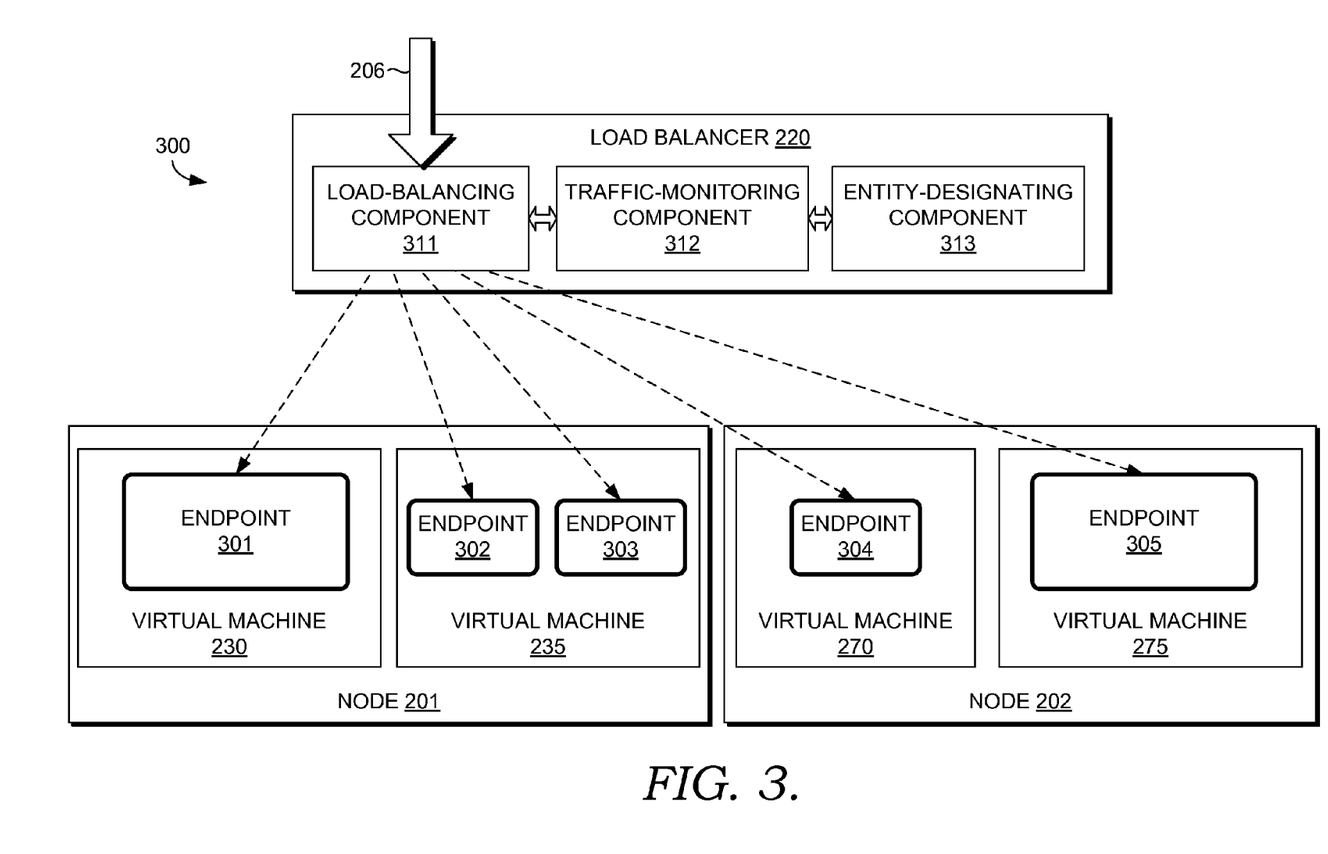
FIG. 3 is block diagram of an exemplary distributed computing network depicting a discrepancy in treatment of small entities and large entities, in accordance with an embodiment of the present invention.

Typically, the nodes 201, 202, and 203 of FIG. 2 and the load balancer 220 of FIG. 3 include, or are linked to, some form of a computing unit (e.g., central processing unit, microprocessor, etc.) to support operations of the VMs, and/or components 311, 312, and 313 running thereon. As utilized herein, the phrase "computing unit" generally refers to a dedicated computing device with processing power and storage memory, which supports one or more operating systems or other underlying software. In one instance, the computing unit is configured with tangible hardware elements, or machines, that are integral, or operably coupled, to the nodes 201, 202, and 203 of FIG. 2 and the load balancer 220 of FIG. 3 to enable each endpoint 301-305 to perform a variety of processes and operations. In another instance, the computing unit may encompass a processor (not shown) coupled to the computer-readable medium accommodated by the nodes 201, 202, and 203 of FIG. 2 and the load balancer 220 of FIG. 3. Generally, the computer-readable medium stores, at least temporarily, a plurality of computer software components (e.g., components 311, 312, and 313) that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

In one aspect, the VMs operate within the context of the cloud-computing network 200 and, accordingly, may communicate internally within the nodes 201, 202, and 203 of FIG. 2; communicate across physical nodes through network connections dynamically made that traverse a data center; and externally through a physical network topology to resources of a remote network (e.g., enterprise private network). The network connections may involve interconnecting VMs distributed across physical resources of the data center via a network cloud 205. The network cloud 205 interconnects these resources such that one VM may recognize a location of another VM in order to establish a communication therebetween. For instance, the network cloud 205 may establish this communication over channels connecting VMs hosting component programs of a common service application. By way of example, the channels may include, without limitation, one or more local area networks (LANs) and/or wide area networks (WANs). Such networking environments are commonplace in offices, enterprise-wide computer networks, intranets, and the Internet. Accordingly, the network is not further described herein.

Operation of the Load Balancer

Turning now to FIG. 3, the general functionality of the components 311, 312, and 313 running on the host load balancer 220 will now be described with respect to balancing the bandwidth between the endpoints 301-305. Generally, FIG. 3 illustrates a block diagram of an exemplary distributed computing network 300, where the network 300 is equipped to selectively control treatment of small entities (e.g., endpoints 302, 303, and 304) and large entities (e.g., 301 and 305), in accordance with embodiments of the present invention. For instance, the load balancer 220 may be configured to distribute traffic between multiple instances of application(s). As more fully discussed above, the endpoints 301-305 reside on virtual machines, such as virtual machines 230, 235, 270, and 275, which support the operation of the endpoints 301-305. Further, the virtual machines 230, 235, 270, and 275 reside on the nodes 201 and 202, which support the operation of the virtual machines 230, 235, 270, and 275. It should be noted that the network components on which the endpoints 301-305 reside are not limited to virtual machines, and may include any network components (e.g., physical nodes) capable of supporting the operations of the endpoints 301-305.

In operation, the components 311, 312, and 313 are each programmed to perform various aspects of the process for fairly sharing bandwidth among the endpoints 301-305 of the network 300, to which the components 311, 312, and 313 are responsible for load balancing. Generally, the traffic-monitoring component is capable of abstracting levels of bandwidth consumption for each of the endpoints 301-305 individually. In one instance, abstracting a level of bandwidth consumption may involve monitoring a flow of the data packets 206 over a network connection (e.g., see dashed lines of FIG. 3) within the network 300. A rate of data-packet flow may be distilled for each of the endpoints 301-305, where the rate is typically measured over a short window of time (e.g., 200 ms) in order to capture a substantially instantaneous level or bandwidth consumption for the endpoints 301-305. In other embodiments, for example, the rate of data-packet flow is measured over a longer window of time (e.g., 1 second) in order to capture a smoother, rolling averaged, set of values.

By way of example, the traffic-monitoring component 312 may employ one or more mechanisms to track the rate of data-packet flow directed to the endpoints 301-305, which, as mentioned above, is indicative of the bandwidth being consumed by the endpoints 301-305. In one embodiment, a counter mechanism may be used to count the bytes transferred to and/or from each endpoint 301-305 or tenant within the data packets 206 over a predefined time interval, where the predefined time interval may be statically fixed or dynamically changing. The counter mechanism may be located at the load balancer 220 and reside in communication with the traffic-monitoring component 312. However, location of the counter mechanism is not limited to the load balancer 220. For instance, the counter mechanism may be located on the nodes 201 and 202 of FIG. 3 (e.g., integrated within the functionality of the hosts 211-213 of FIG. 2), the router 215 of FIG. 2, or any other location upstream or downstream of the load balancer 220 that allows the counter mechanism to watch the data being transferred to and from the endpoints 301-305.

Upon determining the bandwidth usage for the respective endpoints 301-305, the traffic-monitoring component 312 may maintain temporary record of bandwidth-usage statistics (e.g., based on data consumption and/or data-packet traffic) for each endpoint 301-305. The bandwidth usage for each tenant may be computed and stored as well, where the tenant bandwidth usage is determined by combining the bandwidth consumed by the endpoints owned by each of the tenants. As more fully discussed below, the bandwidth usage may be measured substantially instantaneously (i.e., dynamically fluctuating in value in relation to the present flow of data packets) or, for example, measured using an exponential moving average (e.g., running average of bytes conveyed to a particular endpoint or non-fluctuating bandwidth being consumed by a tenant).

Further, the traffic-monitoring component 312 may derive an aggregation of the bandwidth usages, which is later employed to detect a total, instantaneous level of load on the network 300. This bandwidth usage is also used to classify tenants and/or endpoints. Accordingly, although the following discussion focuses on classifying the endpoints 301-305, the various processes described are equally applicable to tenants of the network 300.

The entity-designating component 313 is capable of dynamically classifying the network endpoints 301-305 based on, in part, the bandwidth usage abstracted by the traffic-monitoring component 312. Generally, classifying comprises designating some network endpoints as small entities, or "rills," upon determining that the abstracted level of bandwidth consumed by these network endpoints is below a predefined endpoint threshold. As shown in FIG. 3, endpoints 302, 303, and 304 are illustrated with smaller shapes to indicate they have been classified as small entities. Classifying may further involve designating other network endpoints as large entities, or "rivers," upon determining that the abstracted level of bandwidth consumed by these network endpoints is above the predefined endpoint threshold. As shown in FIG. 3, endpoints 301 and 305 are illustrated with larger shapes to indicate they have been classified as large entities. In an exemplary embodiment, the "predefined endpoint threshold" represents a static or dynamically changing value that is calculated as a function of some proportion of the available network bandwidth. In one instance, the predefined endpoint threshold represents a percentage of capacity allocated to network connections reaching the network endpoints 301-305, respectively. By way of example, the value of the predefined endpoint threshold is fixed as 10% of the allowable bandwidth (e.g., 1 Gbps) or traffic (e.g., incoming data packets, outgoing data packets, or both) that may be handled by a network connection that links the load balancer 220 of FIG. 2 to a particular endpoint. Accordingly, if the bandwidth or traffic traversing the network connection reaches a level greater than 10%, the particular endpoint is considered to be a large entity.

Upon individually categorizing endpoints as small or large entities, the tenants may be categorized by aggregating the bandwidth usage of the endpoints (e.g., endpoints 302 and 303 sharing a virtual machine 235) assigned to a common tenant. At this point, the categorization is conveyed to the load-balancing component 311 to implement one or more techniques to ensure that the data packets are intelligently limited before the underlying network protocols become involved, which unintelligently drop packets indiscriminately.

Although various different criteria for classifying endpoints as rivers (high flow of data) or rills (low flow of data) have been described, it should be understood and appreciated that other types of suitable algorithms that categorize based on one or more parameters may be used, and that embodiments of the present invention are not limited to classifying as a function of average or instantaneous traffic/bandwidth at an endpoint, as described herein. For instance, embodiments of the present invention contemplate mechanisms that are configured to categorize endpoints using such criteria as the following: an amount and/or type of data being conveyed, an amount of data being processed, a number or type of resources being utilized, a level of compute capacity being consumed, and/or a level of storage capacity being consumed.

The load-balancing component 311 is configured to take one or more actions based on, in part, a level of aggregate bandwidth, or "load" on the network 300, that is presently being consumed by the endpoints 301-305, as determined by the traffic-monitoring component 312. For instance, upon identifying the level of load exceeds a first network threshold (e.g., by comparing the aggregation of the abstracted bandwidth usages against the first network threshold), the load-balancing component 311 may randomly drop some of the data packets 206 being sent to or transmitted by the endpoints 301 and 305 currently designated as large entities. In this way, the load-balancing component 311 intelligently sacrifices a metered amount of traffic directed to and/or flowing from the larger tenants that are likely to be associated with the increase in bandwidth usage (e.g., targeted by an attack or generating congestion via processing).

At the same time, the load-balancing component 311 is capable of refraining from dropping the data packets 206 being sent to or transmitted by the endpoints 302-304 currently designated as small entities. Accordingly, there is no or reduced impact applied to the smaller tenants that are unrelated to the increase in bandwidth usage. Thus, by maintaining as much traffic as possible for the smaller tenants, endpoints, or users (i.e., do not discard any traffic if possible), the effects of the congestion or attacks are properly restricted to the larger tenants, endpoints, or users.

Stated another way, when the network 300 is not under stress (e.g., total amount of traffic is below the first network threshold), the load-balancing component 311 allows all the data packets 206 through to their intended destination(s). When the network 300 is under stress (e.g., total amount of traffic is at or above the first network threshold), the load-balancing component 311 probabilistically drops packets of the endpoints 301 and 305 currently designated as large entities to achieve fairness for the endpoints 302, 303, and 305 currently designated as small entities. Typically, the load-balancing component 311 drops the packets in a preemptive manner (i.e., before the network is stressed to a point where the underlying network protocol beings dropping traffic randomly across all the entities 301-305 indiscriminately). Advantageously, by intercepting the data packets and dropping them forcefully according to the algorithm(s) discussed above, the load-balancing component relieves the underlying network protocol from its responsibility and allows for intelligently selecting which data packets are dropped.

In embodiments, the load-balancing component 311 probabilistically drops data packets upon the aggregate bandwidth usage overcoming a predefined network threshold. As used herein, the phrase "predefined network threshold" is not meant to be restrictive, but may encompass any value that is statically or dynamically set to trigger the preemptive discard of traffic. Generally, the predefined network threshold is set at a value slightly less than the point at which the underlying network protocol commences automatically dropping data packets. By way of example, if the underlying network protocol commences automatically dropping data packets upon reaching a maximum allowable capacity of 1 Gbps, the value of the predefined network threshold may be set to 0.8 Gbps. By setting the predefined network threshold in this manner, the scenario where traffic is being discarded without sufficient network stress is avoided, while, at the same time, there exists enough differential bandwidth to being new flows of data-packet traffic without the load-balancing component 311 being saturated. In another embodiment, the predefined network threshold may be set at a value slightly above the point at which the underlying network protocol commences automatically dropping data packets to reduce the computational overhead during mild congestion.

The load-balancing component 311 is further configured to increase/decrease a rate at which the data packets 206 sent to the network endpoints 301 and 305 are dropped upon recognizing an increase/decrease in the levels of bandwidth being presently consumed by the network endpoint 301 and 305, respectively (i.e., the more traffic encountered by a given large entity, the more traffic being dropped). In one instance, the rate at which the data packets 206 are dropped may be linearly tied to the levels of bandwidth consumed by the network endpoints 301 and 305, respectively. That is, the probability of dropping data packets increases with the size of the large entity, with substantially no probability of dropped packets for small entities.

By way of example, if the predefined endpoint threshold is set at 10% of allowable bandwidth on a network connection, as discussed in the example above, the probability of dropping packets for a large entity ramps up correspondingly with increases in the flow of data-packet traffic above the predefined endpoint threshold. For instance, the probability of dropping a data packet increases linearly from 0 (at the point when the endpoint 301 is considered a large entity) to 1 (at the point when the endpoint 301 reaches a predetermined upper limit of bandwidth consumption). In this way, a tenant currently under attack will naturally have more traffic dropped than another tenant (i.e., discarding an amount of traffic that is proportional to the amount of traffic presently detected for a large entity).

However, other embodiments of the present invention contemplate exponentially tying or otherwise relating a particular network endpoint's data-packet-discard rate to the abstracted level of bandwidth consumption by the particular network endpoint in a manner that is not necessarily linear in nature. Still other embodiments of the present invention contemplate tying a particular network endpoint's data-packet-discard rate to other metrics measured from the network 300.

Further, the upper limit on a portion of packets discarded may be set at other values besides 1. For example, the upper limit on the portion of packets discarded may be set at 0.6 in order to ensure that too much of the data-packet traffic is not discarded.

In an exemplary embodiment, the load-balancing component 311 probabilistically drops a select amount of data packets 206 heading toward or coming from the endpoints 301 and 305. The use of probabilistically dropping packets builds in randomness such that the load-balancing component's 311 preemptive discarding of traffic does not interfere with the underlying network protocol in a way that would cause the underlying network protocol to misbehave. For instance, if the load-balancing component 311 dropped traffic with some form of bias or pattern, the underlying network protocol may fail to operate properly. By way of example, if the load-balancing component 311 determines that 20% of the traffic to the endpoint 301 should be discarded within a ten-minute time period, and if the load-balancing component 311 scheduled dropping packets during just the first minute of the time period, this nonrandom approach would interfere with the underlying network protocol (e.g., TCP) by overloading its retry mechanism. Generally, the retry mechanism attempts to resend traffic after being discarded. Accordingly, without the use of probabilistically dropping packets, traffic being transmitted to the endpoint 301 is essentially deleted, as opposed to being just delayed. In another example, if load-balancing component 311 drops data packets in large bursts, as opposed to randomly, the underlying network protocol might inadvertently determine that the network connection to the endpoint 301 is broken; thus, prompting the underlying network protocol to terminate the network connection in order to open a new network connection.

If, upon discarding traffic in an attempt to reduce the overall network bandwidth, the load-balancing component 311 detects that its fair-sharing efforts are ineffective (e.g., load reduction cannot be distributed among just the large entities in order to achieve balance), the load-balancing component 311 may cause the traffic directed to the small entities to be discarded. In one instance of causing the traffic directed to the small entities to be discarded, the load-balancing component 311 may switch off and allow the underlying network protocol, or operating system, to take over using the default randomized dropping of the data packets 206 (i.e., reinstate random sharing between the small entities to dilute the affect to any particular tenant). Or, in another instance of causing the traffic directed to the small entities to be discarded, the load-balancing component 311 may continue to actively operate and randomly drop the data packets 206 sent to the network endpoints 302-304 in a manner that differs from the algorithm used by the underlying network protocol.

In embodiments, the load-balancing component 311 may cause the traffic directed to the small entities to be discarded upon the stress in the network 300 reaching a second network threshold. Generally, the second network threshold represents a value of usage of network bandwidth that is greater than a value of usage of network bandwidth represented by the predefined network threshold, or first network threshold.

It should be appreciated and understood that the components 311-313 are exemplary in number and location. For instance, any number of components may be used, such as a combination of the functionality of the components 311-313 into a single component (e.g., load balancer 220 of FIG. 2). Also, the location of the components 311-313 may vary from the illustrated location of the load balancer 220 of FIG. 3. For instance, the one or more of the components 311-313 may be located on the nodes 201 and 202 of FIG. 3, the router 215 of FIG. 2, the virtual machines of FIGS. 2 and 3, and/or any other location(s) that allow for reading bandwidth usage (e.g., access to data packets) and affecting bandwidth usage (e.g., access to network connections).

In another implementation the fair-bandwidth-sharing feature, the components 311-313 may sit in front of the load balancer 220, such that the operation of the components 311-313 is independent from the load balancer 220 functionality and occurs precedent thereto. The fair-bandwidth-sharing feature of the components 311-313 may also be implemented on a distinct component that resides upstream of the load balancer 220 (i.e., without being physically a part of the load balancer 220). For example, to ensure that the load balancer 220 does not receive more traffic than it can handle, the operation of the components 311-313 may be conducted on the traffic before reaching the load balancer 220. Or, the fair-bandwidth-sharing feature may be implemented in systems where there is no load balancer 220 provided. For instance, a cloud-computing service may implement load balancing as an optional, value-added service, while still applying the fair-bandwidth-sharing feature across its tenants at network level. In this instance where load balancers are not present (e.g., in a graph of interconnected computers such as a high-performance computing network), the fair-bandwidth-sharing feature may exist on any network segment in which there is a risk of congestion, ensuring that small computing jobs are not swamped by large jobs. It should be understood and appreciated that other scenarios of the placement of the components 311-313 with respect to the load balancer 220, or absence of the load balancer 220, are contemplated by embodiments of the present invention, and that the illustrative positioning of the fair-bandwidth-sharing feature in FIG. 3 should not be construed as limiting.

Exemplary Process Flows

Figure 4:
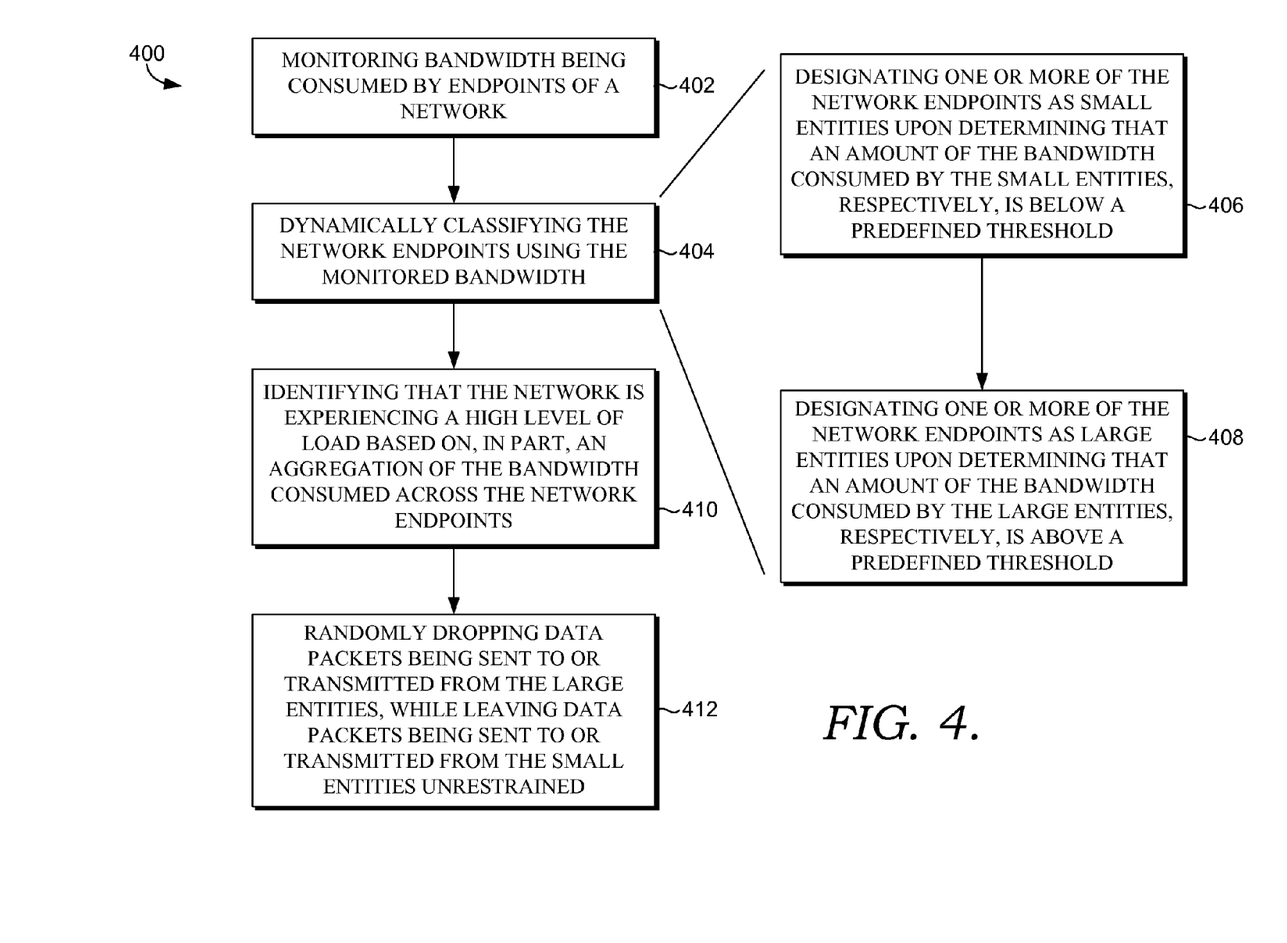
FIG. 4 is a flow diagram showing an exemplary method for performing a method for probabilistically sharing bandwidth of a network between tenants to achieve isolation of the tenants, in accordance with an embodiment of the present invention.

Turning now to FIG. 4, a flow diagram is illustrated that shows an exemplary method 400 for fairly sharing bandwidth of a network between tenants to achieve isolation of the tenants, in accordance with an embodiment of the present invention. Although the terms "step" and/or "block" may be used herein to connote different elements of methods employed, the terms should not be interpreted as implying any particular order among or between various steps herein disclosed unless and except when the order of individual steps is explicitly described. Initially, the method 400 may commence upon a load balancer, router, or other gateway to the network and/or the tenants monitoring the bandwidth being consumed by the tenant's endpoints within the network, as depicted at block 402. Typically, monitoring the bandwidth consumed by endpoints of the network includes measuring a flow of data-packet traffic over network connections that link a load balancer with the network endpoints, respectively.

In an exemplary embodiment, as depicted at block 404, the method 400 may further involve dynamically classifying the network endpoints, or tenants, using the monitored bandwidth. Typically, classifying comprises designating one or more of the network endpoints as small entities (e.g., endpoints 302, 303, and 304 of FIG. 3) upon determining that an amount of the bandwidth consumed by the small entities, respectively, is below a predefined threshold, as depicted at block 406. Classifying may further comprise designating one or more of the network endpoints as large entities (e.g., endpoints 301 and 305 of FIG. 3) upon determining that an amount of the bandwidth consumed by the large entities, respectively, is above a predefined threshold, as depicted at block 408.

A determination of whether the network is currently experiencing a high level of load or a low level of load is performed, as depicted at block 410. This determination may entail comparing a first network threshold against an aggregation of the bandwidth consumed across the network endpoints (e.g., counting data packets 206 of FIG. 2 handled by the load balancer 220 over a particular period of time). When the aggregation of consumed bandwidth is determined to be greater than the first network threshold, data packets associated with the large entities are randomly dropped, while data packets associated with the small entities are allowed to flow unimpeded, as depicted at block 412. When the aggregation of consumed bandwidth is determined to be less than the first network threshold, data packets associated with both the large entities and the small entities are allowed to flow unimpeded, as the network is experiencing relatively low stress. When the network is experiencing relatively high stress—the aggregation of consumed bandwidth is determined to be greater than a second network threshold—data packets associated with both the large entities and the small entities are randomly dropped.

Figure 5:
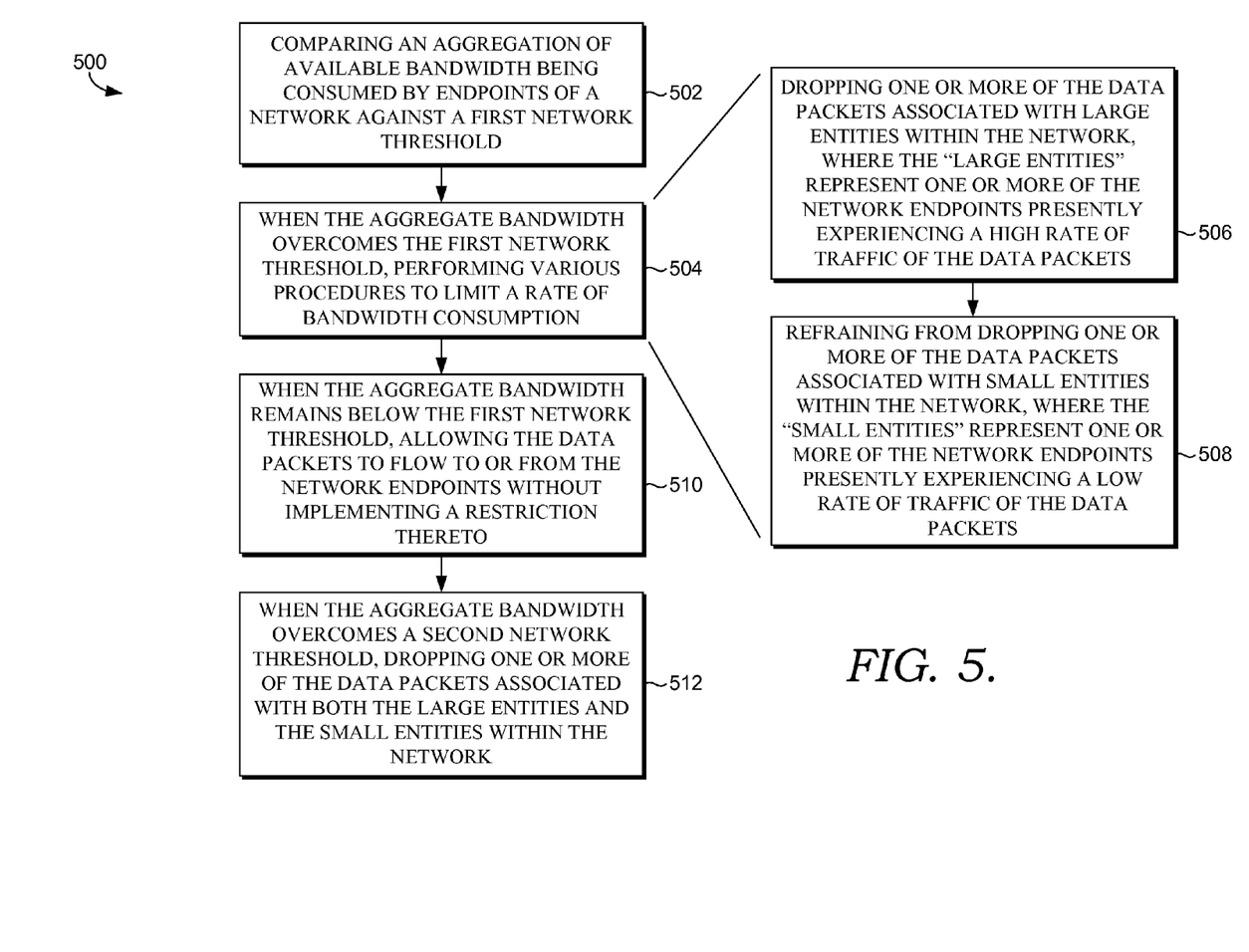
FIG. 5 is a flow diagram showing an exemplary method for limiting the rate of data packets flowing to or from endpoints of a network that are consuming an elevated amount of available bandwidth, in accordance with an embodiment of the present invention.

With reference to FIG. 5, a flow diagram is illustrated showing an exemplary method 500 for limiting a rate of data packets flowing to or from endpoints of a network, where limiting takes effect upon the endpoints consuming an elevated amount of available bandwidth. In embodiments, as depicted at block 502, the method 500 initially involves comparing an aggregation of the available bandwidth being consumed by the network endpoints against a first network threshold. When the aggregate bandwidth remains below the first network threshold, as depicted at block 510, the method 500 involves allowing the data packets to flow to or from the network endpoints without implementing a restriction thereto (i.e., abstaining from dropping packets passing through the load balancer 220 of FIG. 2 or the load-balancing component 311 of FIG. 3).

When the aggregate bandwidth overcomes the first network threshold, as depicted at block 504, the method 500 involves performing of various procedures for fairly sharing bandwidth by enforcing a limitation on the rate of data packets flowing to or from the endpoints of a network by focusing the enforced limitations on those endpoints that are consuming an elevated amount of available bandwidth. In an exemplary embodiment, the various procedures involve, but are not limited to the following: dropping one or more of the data packets being conveyed to large entities (see block 506); and refraining from dropping one or more of the data packets being conveyed to small entities (see block 508).

In some embodiments, as mentioned above, the aggregate bandwidth overcomes a second network threshold, where the second network threshold is typically set at a higher level of load than the first network threshold. In this case, one or more of the data packets being conveyed to the large entities and to the small entities are dropped within the network, as depicted at block 512. This is because dropping just data packets destined to or originating from the large entities will not sufficiently reduce the amount of bandwidth consumption at a speed that prevents surpassing the available network capacity.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-readable storage devices having computer-executable instructions embodied thereon that, when executed, perform a method for fairly sharing bandwidth of a network between tenants to achieve isolation of the tenants, the method comprising:
    monitoring the bandwidth consumed by endpoints of the network;
    dynamically classifying the network endpoints using the monitored bandwidth, wherein classifying comprises:
        designating first one or more endpoints of the network endpoints as small entities upon determining that an amount of the bandwidth consumed by the first one or more endpoints, respectively, is below a predefined threshold; and
        designating second one or more endpoints of the network endpoints as large entities upon determining that an amount of the bandwidth consumed by the second one or more endpoints, respectively, is above a predefined threshold;
    identifying the network overall is experiencing a high level of load based on, in part, an aggregation of the bandwidth consumed across the network endpoints; and
    randomly dropping data packets being sent to or transmitted from the second one or more endpoints based the second one or more endpoints being designated as the large entities, while leaving data packets being sent to or transmitted from the second one or more endpoints unrestrained, each in response to the identifying the network overall is experiencing the high level of load.

2. The one or more computer-readable storage devices of claim 1, wherein the method further comprises:
    identifying the network overall is experiencing a low level of load based on, in part, an aggregation of the bandwidth consumed across the network endpoints; and
    refraining from dropping data packets being sent to or transmitted from the large entities and the small entities in response to the identifying the network overall is experiencing a low level of load.

3. The one or more computer-readable storage devices of claim 1, wherein the method further comprises adjusting a rate at which the data packets are dropped in accordance with a level of load on the network or an amount of bandwidth consumed by the large entities.

4. The one or more computer-readable storage devices of claim 1, wherein monitoring the bandwidth consumed by endpoints of the network comprises measuring a flow of data-packet traffic over network connections that link a load balancer with the endpoints, respectively.

5. The one or more computer-readable storage devices of claim 1, wherein identifying the network overall is experiencing the high level of load comprises:
    comparing the aggregation of the bandwidth consumed across the network endpoints against a predefined threshold; and
    recognizing that the aggregation of the consumed bandwidth overcomes the predefined threshold.

6. The one or more computer-readable storage devices of claim 2, wherein identifying the network overall is experiencing a low level of load comprises:
    comparing the aggregation of the bandwidth consumed across the network endpoints against a threshold; and
    recognizing that the aggregation of the consumed bandwidth resides below the threshold.

7. A computer system capable of performing load-balancing operations with respect to endpoints of a network that receive or originate data packets, the computer system comprising at least one physical machine configured with a computer-storage medium having a plurality of computer software components running thereon, the computer software components comprising:
    a traffic-monitoring component that abstracts a first level of bandwidth consumption of a first network endpoint and a second level of bandwidth consumption of a second network endpoint, wherein an aggregation of the first and second abstracted bandwidths is employed to detect a level of load on the network overall;
    an entity-designating component that dynamically classifies the first and second network endpoints using the first and second abstracted bandwidths, wherein classifying comprises:
        designating the first network endpoint as a small entity upon determining that the first level of bandwidth consumed by the first network endpoint is below an endpoint threshold; and
        designating the second network endpoint as a large entity upon determining that the second level of bandwidth consumed by the second network endpoint is above the endpoint threshold; and
    a load-balancing component configured to randomly drop data packets sent to or transmitted by the second network endpoint based on the second network endpoint being designated as the large entity, while refraining from dropping data packets being sent to or transmitted by the first network endpoint based on the first network endpoint being designated as the small entity, upon identifying the detected level of load on the network overall exceeds a first network threshold, wherein the load-balancing component increases or decreases a rate at which the data packets are randomly dropped upon recognizing an increase or decrease in a level of bandwidth consumed by the second network endpoint.

8. The computer system of claim 7, wherein identifying the detected level of load exceeds a first network threshold involves comparing the aggregation of the first and second abstracted bandwidths against the first network threshold.

9. The computer system of claim 7, wherein the endpoint threshold is calculated using a percentage of capacity allocated to network connections reaching the first and second network endpoints, respectively.

10. The computer system of claim 7, wherein the load-balancing component is further configured to randomly drop the data packets sent to or transmitted by the first and second network endpoints, upon identifying the detected level of load on the network overall exceeds a second network threshold.

11. The computer system of claim 10, wherein the second network threshold represents a value of usage of network bandwidth that is greater than a value of usage of network bandwidth represented by the first network threshold.

12. The computer system of claim 7, wherein the load-balancing component is configured to increase the rate at which the data packets are randomly dropped upon recognizing the increase in the level of bandwidth consumed by the second network endpoint.

13. The computer system of claim 12, wherein the rate at which the data packets sent to or transmitted by the second network endpoint are dropped is related to the second level of bandwidth consumed by the second network endpoint.

14. The computer system of claim 7, wherein the first and second network endpoints are supported by one or more virtual machines running on a least one node.

15. The computer system of claim 14, wherein the load-balancing component resides on the at least one node, a device equipped with load-balancing responsibilities, or a router that directs traffic to and from the network.

16. The computer system of claim 7, wherein the first and second network endpoints are assigned to different tenants of the network.

17. A computerized method for limiting a rate of data packets flowing to or from endpoints of a network that are consuming an elevated amount of available bandwidth, the method comprising:
   determining that overall network capacity of the network is exceeded based on comparing an aggregation of the available bandwidth being consumed by the network endpoints against a first network threshold; and
   in response to the determining that the overall network capacity of the network is exceeded, performing the procedures comprising:
      dropping one or more of the data packets being conveyed to large entities within the network, wherein the large entities represent one or more of the network endpoints presently experiencing a high rate of traffic of the data packets; and
      refraining from dropping one or more of the data packets being conveyed to small entities within the network, wherein the small entities represent one or more of the network endpoints presently experiencing a low rate of traffic of the data packets.

18. The computerized method of claim 17 further comprising:
   subsequently determining that overall network capacity of the network is no longer exceeded; and
   allowing the data packets to flow to or from the network endpoints without implementing a restriction thereto in response to the determining that the overall network capacity of the network is no longer exceeded.

19. The computerized method of claim 18, when the aggregate bandwidth overcomes a second network threshold, dropping one or more of the data packets being conveyed to the large entities and to the small entities within the network.

20. The computerized method of claim 19, wherein the second network threshold represents a higher value of usage of the network bandwidth in comparison to a value of usage of network bandwidth represented by the first network threshold.

* * * * *